May 30, 1972  S. W. ALDERFER  3,666,589
METHOD FOR MAKING INDUSTRIAL ROLLS
Original Filed July 1, 1968  6 Sheets-Sheet 3
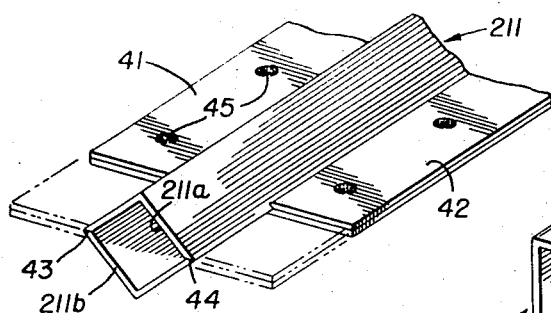
FIG. 7
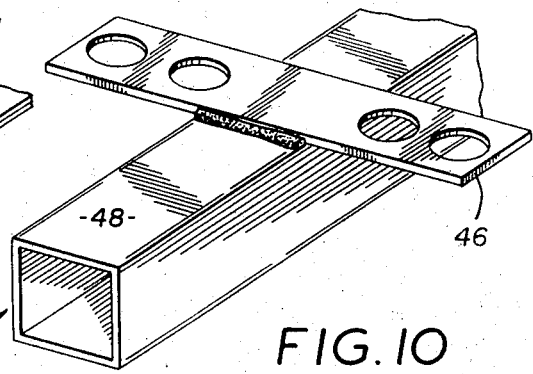
FIG. 10
FIG. 8
FIG. 9
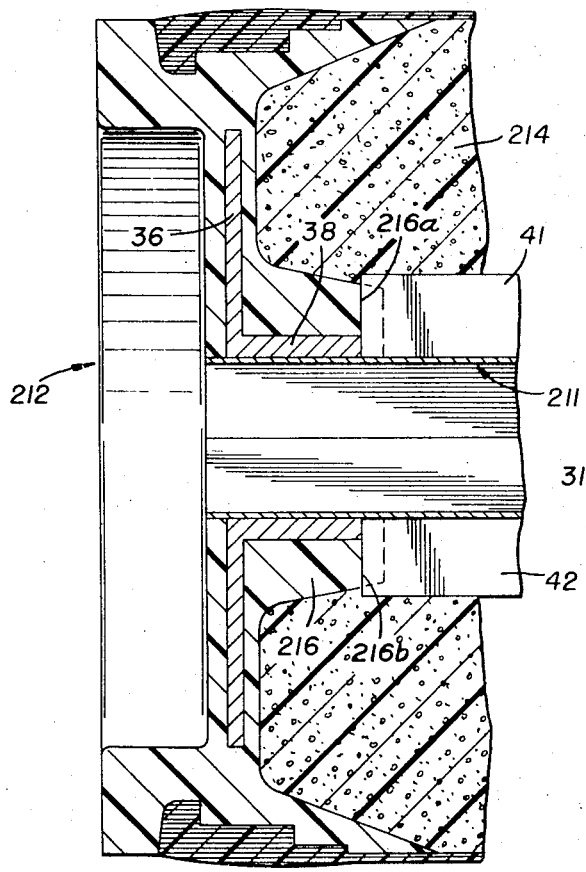
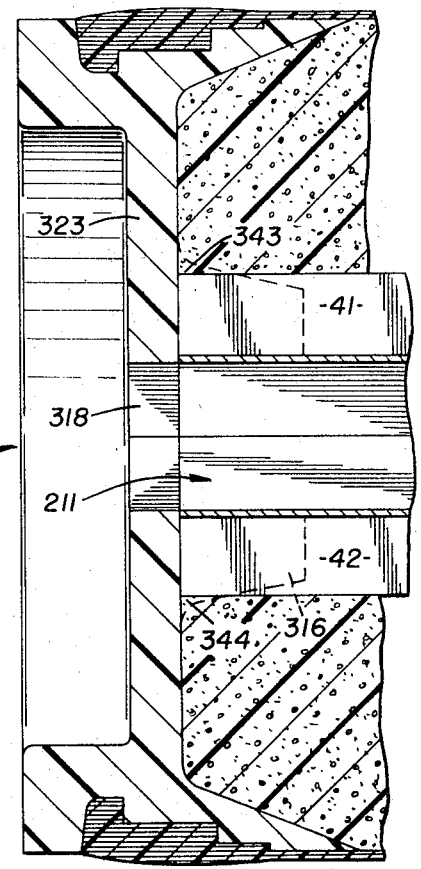
INVENTOR.
STERLING W. ALDERFER
BY Hamilton, Cook,
Renner & Kenner
ATTORNEYS May 30, 1972   S. W. ALDERFER   3,666,589
METHOD FOR MAKING INDUSTRIAL ROLLS
Original Filed July 1, 1968   6 Sheets-Sheet 5
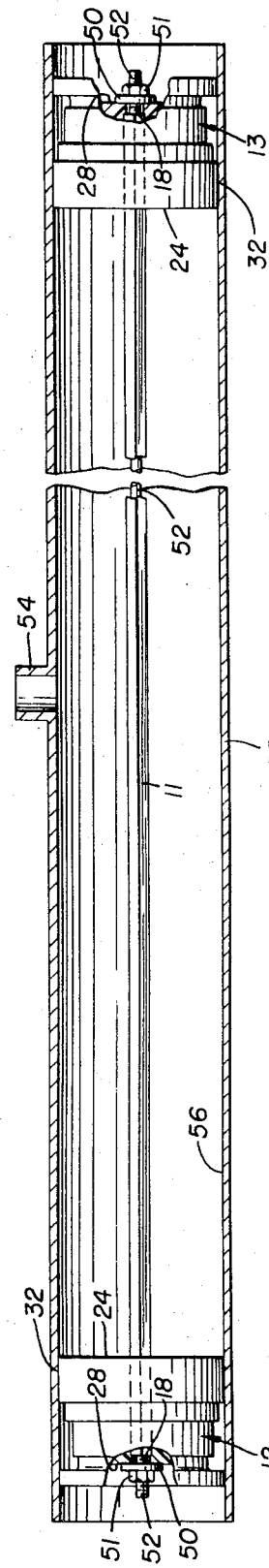
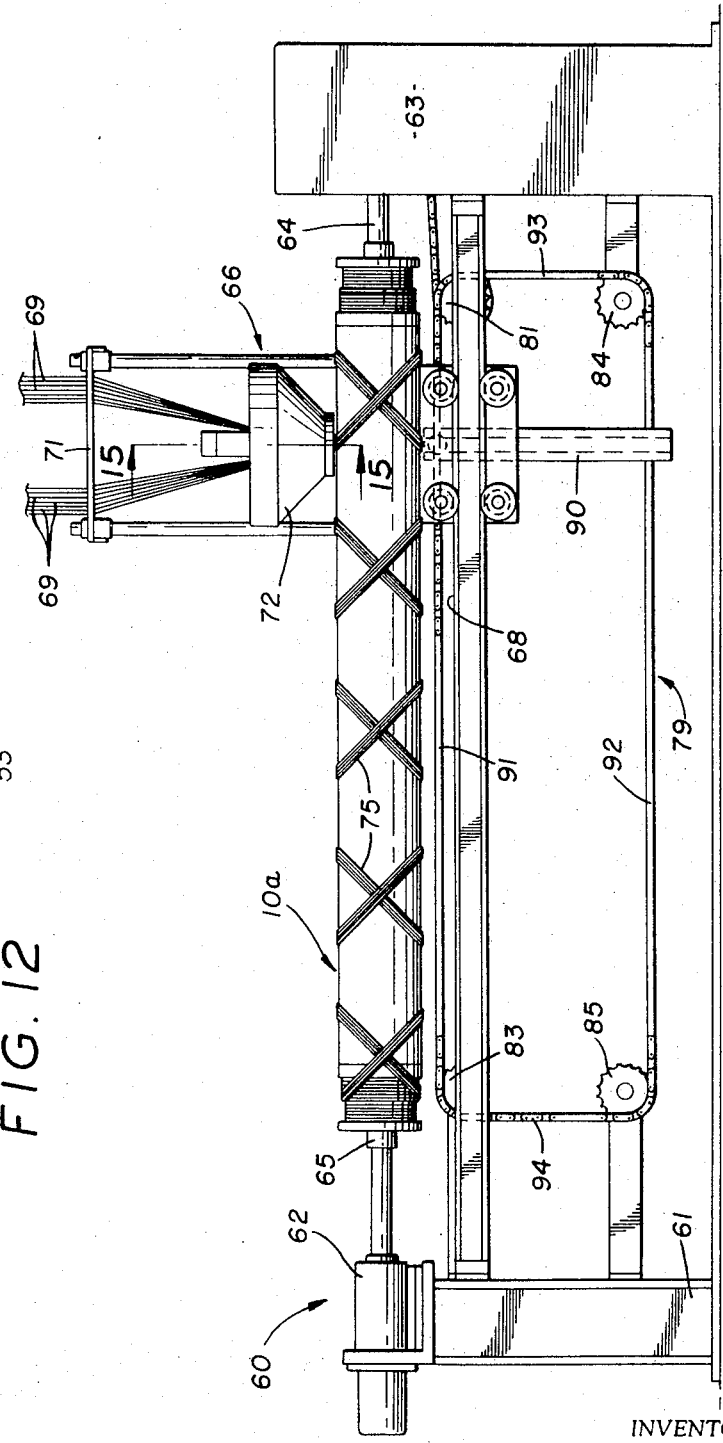
INVENTOR.
STERLING W. ALDERFER
BY Hamilton, Cook.
Renner & Kenner
ATTORNEYS May 30, 1972    S. W. ALDERFER    3,666,589
METHOD FOR MAKING INDUSTRIAL ROLLS
Original Filed July 1, 1968    6 Sheets-Sheet 6
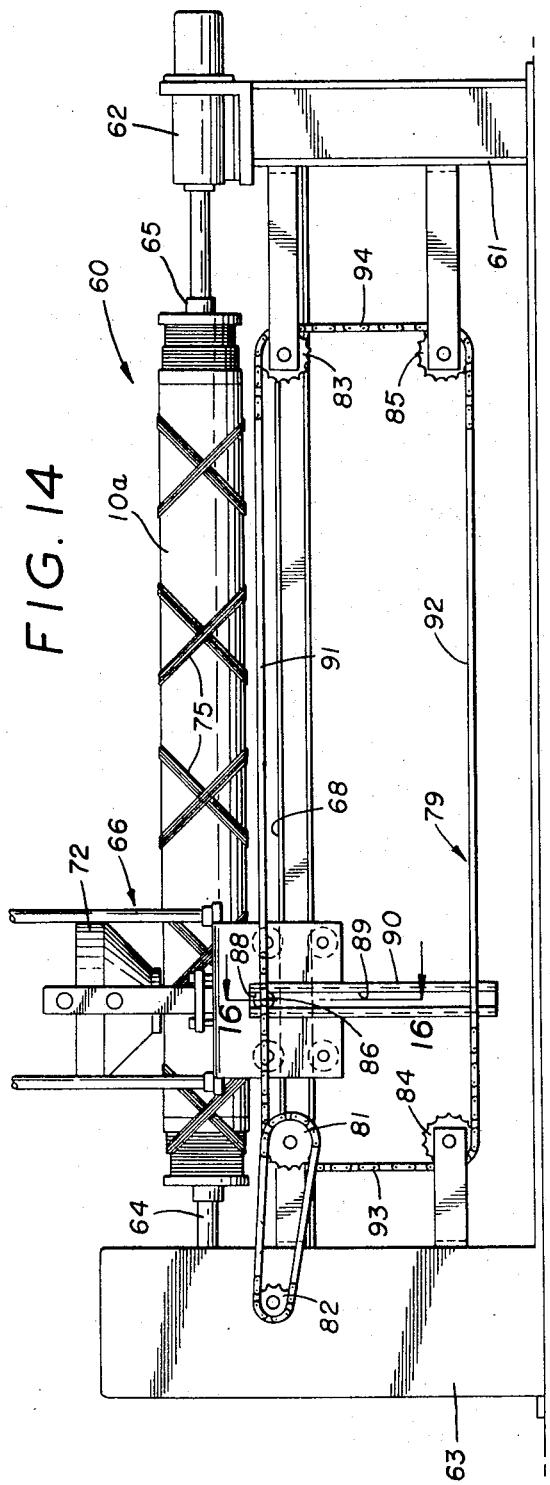
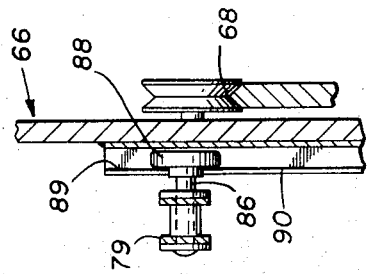
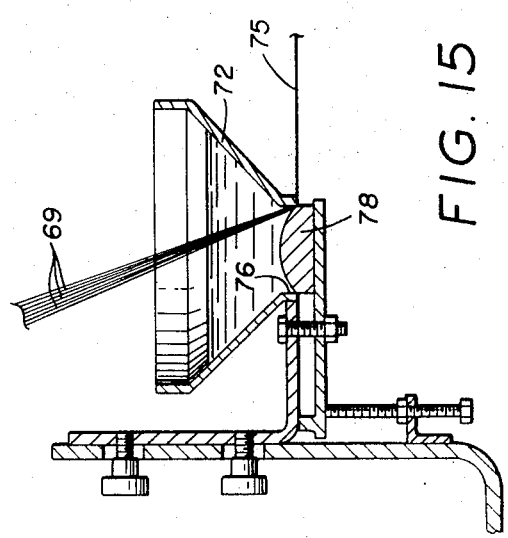
INVENTOR.
STERLING W. ALDERFER
BY Hamilton, Cook,
Renner & Kenner
ATTORNEYS United States Patent Office 3,666,589
Patented May 30, 1972

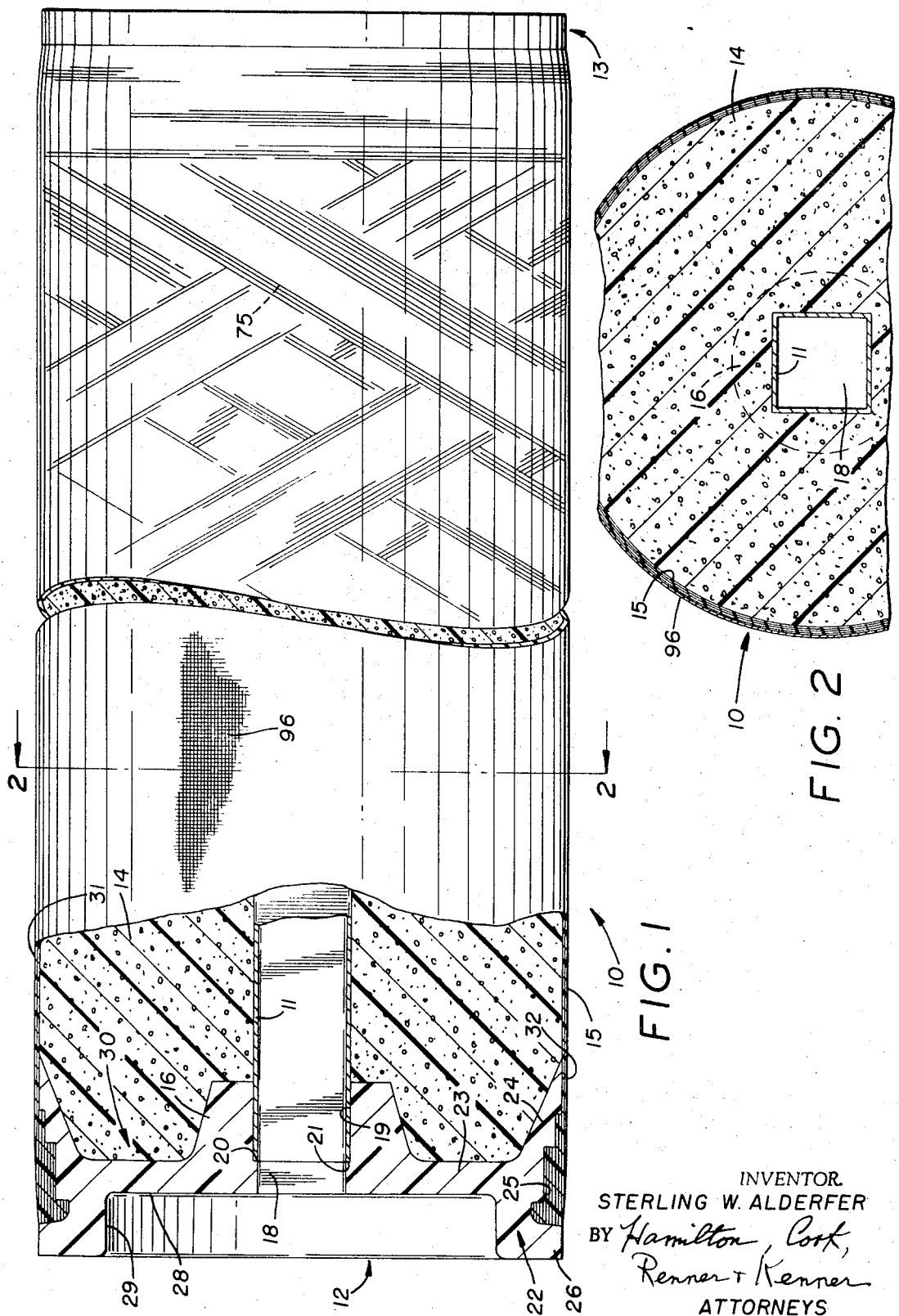

3,666,589
METHOD FOR MAKING INDUSTRIAL ROLLS
Sterling W. Alderfer, Akron, Ohio, assignor to
Teledyne, Inc., Los Angeles, Calif.
Original application July 1, 1968, Ser. No. 741,727, now
Patent No. 3,571,878. Divided and this application
Mar. 2, 1970, Ser. No. 18,535
Int. Cl. B65h 81/02
U.S. Cl. 156—172
2 Claims

ABSTRACT OF THE DISCLOSURE

The improved industrial roll has axially spaced, preferably elastomeric, cylindrical head members with a beam extending therebetween. A core, preferably of rigid urethane foam, extends cylindrically between the head members and encases the beam. The head members and core are, in turn, encased within a skin that is preferably a filled polyester resin, the skin being locked to the head members. A coupling may be utilized to assist with torsional load transfer between the beam and each head member, and blades may be used to transfer such loads between the beam and the core. To make such a roll, the head members are positioned at the ends of a beam and a core is molded around the beam and between the head members. The resulting skeletal roll is then provided with the skin that locks the head members to the core. The apparatus for applying the skin comprises a winder for wrapping a ribbon-like skin component helically about the skeletal roll. Sufficient wraps are made completely to encase the core, and a drive mechanism employing a lost motion connection wraps additional lengths of ribbon into a lock groove in each head member to join the components together in an integral roll.

RELATED APPLICATIONS

This application is a divisional application of my prior copending application, Ser. No. 741,727, filed July 1, 1968, now U.S. Pat. No. 3,571,878, issued Mar. 23, 1971.

BACKGROUND OF THE INVENTION

The present invention relates to industrial rolls, or spools. The evolution of roll construction is most illuminating as to the advantages afforded by the improvement in construction of, and method of making, industrial rolls embodying the concept of the present invention.

Less than forty years ago the prevalent practice was to make industrial rolls of solid wood. However, such rolls were subject to rapid deterioration, cracking and splintering. Moreover, if the roll was to be used as a spool, end flanges were glued or pinned onto the roll, and the difficulties engendered simply by the manner of this connection initiated copious efforts to solve that problem alone.

Eventually, the art experimented with tubular, metallic barrels to which end heads were attached. Although somewhat heavier than their wooden counterparts, the metallic barrel did overcome the major disadvantages of the solid wood roll recited above. However, for some applications, the material to be wound onto the roll had to be wound so tightly that the thickness of the metallic barrel had to be greatly increased to possess the necessary hoop strength. Then, with the advent of nylon, synthetic material sold under the trademark dacron and the like (materials which tend to shrink as they cool and/or dry) the compression, or hoop, stresses applied by these materials to the rolls upon which they were wound became so severe that the cylindrical, metallic barrels had to be further reinforced.

One form of reinforcement utilized a plurality of steel rods oriented axially of the roll and located in juxtaposition with the radially inner surface of the tubular barrel portion. These rods were supported from the end heads.

Other forms of reinforcement utilized a plurality of disks, or other internal bracing, positioned at intervals along, and oriented generally transversely to, the axis of the roll. These disks, or braces, engaged the internal surface of the tubular barrel portion to assist in the support thereof. Even with such internal reinforcement, however, the beam strength of the barrel portions spanning between successive braces had to be sufficient to withstand the collapsing forces applied.

As can be appreciated, this additional reinforcement makes the resulting roll so heavy that it is difficult, if not dangerous, to handle, and adds markedly to any shipping costs involved in transporting the material wrapped thereon.

Attempts have also been made to strengthen paper tubes with fillers and attach end heads, but here, irrespective of the internal reinforcement, the surface of the tube itself is not sufficiently hard to withstand the compressive loads. Moreover, the connection of the end heads to the tube has been found to be relatively unstable under conditions of severe use.

And, several attempts have been made to join molded sections into a roll. Generally, these attempts employ at least three pieces that are abuttingly joined. Such a construction, however, inherently results in two joints in which the material subsquently wound onto the spool can catch. About the only known attempt to obviate this difficulty was the disclosure of a roll made by the joinder of two, opposed molded sections. This merely reduces the number of joints from two to one, and while thus reducing the problem, does not eliminate it. Moreover, the connecting structure by which the molded sections have heretofore been joined is itself generally of a nonpermanent, or nonstable, nature and itself adds unnecessarily to the weight of the roll.

SUMMARY OF THE INVENTION

It is, therefore, a primary object of the present invention to provide a roll that is light in weight, and therefore easy to handle, which is capable of withstanding extreme hoop stresses.

It is another object of the present invention to provide a roll, as above, which, though comprised of distinct components, is an integral, unjointed, finished product that will not readily or accidentally disassemble.

It is a further object of the present invention to provide a roll, as above, the surface of which is not subject to rapid deterioration, cracking and/or splintering.

It is still another object of the present invention to provide a method for fabricating a roll, as above.

These and other objects of the present invention, as well as the advantages thereof over existing and prior art forms, are accomplished by means hereinafter described and claimed.

In general, an industrial roll embodying the concept of the present invention has opposed, generally cylindrical, head members with a beam extending therebetween.

The beam is embedded in a rigid core that extends cylindrically between the head members. The core is encased in an outer skin that is locked to the opposed head members. The head members are preferably a urethane elastomer, and the core is preferably a rigid urethane foam, while the skin is preferably a polyester resin reinforced with fibrous glass. For high torsional loads a transfer coupling may be used between the beam and each head member and/or transfer blades may be used between the beam and the core.

To fabricate such a roll, the head members are molded and the beam is fabricated. A head member is then clamped to each of the opposed ends of the beam, and this assembly is placed in a mold. The core is formed in the mold and the resulting skeletal roll is removed so that one or more reinforcing ribbons, coated with resin, may be wound onto the cylindrical outer surface of the core to form a skin which is locked into the opposed head members.

Five preferred embodiments of the subject industrial roll, together with a description of the preferred method for making such a roll, are shown by way of example in the accompanying drawings and are described in detail without attempting to show all of the various forms and modifications in which the invention might be embodied; the invention being measured by the appended claims and not by the details of the specification.

DESCRIPTION OF THE DRAWINGS

FIG. 1 is a side elevation, partly in section, of an industrial roll embodying the concept of the present invention;

FIG. 2 is a cross section taken substantially on line 2—2 of FIG. 1;

FIG. 7 is a perspective of an alternative form of beam depicted in solid line representation, and a further modification is represented by the addition of the portion in chain line;

FIG. 8 is a longitudinal section similar to FIG. 6 depicting a roll utilizing a beam according to the solid line representation of FIG. 7;

FIG. 9 is a longitudinal section similar to FIGS. 6 and 8 depicting a roll utilizing a beam according to the chain line representation of FIG. 7;

FIG. 10 is a perspective view of a portion of a beam, as shown in FIGS. 1 and 2, incorporating torsional load transfer blades;

FIG. 12 is a longitudinal section through a mold suitable for forming the core onto the beam extending between the opposed, spaced head members;

FIG. 13 is a frontal schematic representation of an apparatus for applying the skin to the improved roll;

FIG. 14 is a rear schematic representation of the apparatus depicted in FIG. 13;

FIG. 15 is an enlarged cross section through the resin applying pot and taken substantially on line 15—15 of FIG. 13; and, FIG. 16 is an enlarged cross section taken substantially on line 16—16 of FIG. 14.

DESCRIPTION OF THE PREFERRED EMBODIMENTS

Figure 3:
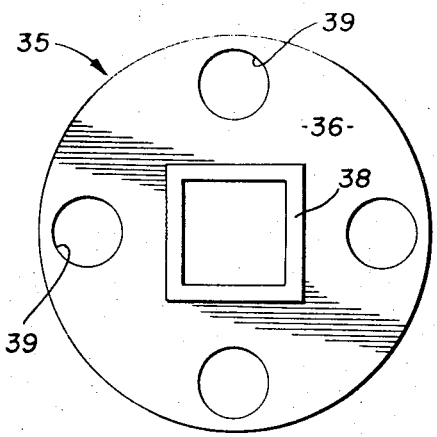
FIG. 3 is an end elevation of a coupler for transferring torsional loading between the head member and beam of the roll.

Referring more particularly to the drawings, one form of an improved roll embodying the concept of the present invention is designated generally by the numeral 10.

A beam 11 extends between the opposed head members 12 and 13, one at each end of the roll 10. A cylindrical core 14 extends between the opposed head members 12 and 13 with the support beam 11 embedded therein. The core 14 is encased by an outer skin 15 that interlocks with the head members 12 and 13 to provide a substantially integral final roll 10.

In the preferred forms of the roll depicted herein each head member is formed—i.e., preferably molded—from a urethane elastomer. Urethane elastomers are produced through the reaction of certain polyisocyanates and polyhydroxy compounds to form a long chain, essentially linear macromolecule, which is then chain extended and cross linked to complete the reaction. Conventional urethane elastomers are prepared by mixing polyesters, polyisocyanates and chain extenders together in the liquid state at elevated temperatures and introducing the mixture into molds where they are solidified.

Solidification is, however, only a green cure, or set, and subsequent application of heat is required to complete the cure.

Such elastomers can be easily produced within a hardness range from 60 Shore A up to 75 Shore D while providing excellent tensile and tear strength. Urethane elastomers are very tough and provide exceptional resistance to abrasion, ozone and oxidation so that they make excellent head members for the ends of commercial rolls, or spools.

Each head member 12 and 13 has a central hub portion 16. The hub portion 16 has an aperture 18 to be drivingly engaged by a spindle, not shown, and is, for that reason, preferably polygonal. The aperture 18, depicted as being square, is also axially recessed, at 19, to receive the end of the beam 11. In fact, the recess 19 terminates in a radially directed shoulder 20 to provide a placement stop engageable by the end edge 21 of the beam 11, for a purpose more fully hereinafter made apparent in conjunction with the description of the method by which the improved rolls are made.

The rim portion 22 of each head member is connected to the hub portion 16 by a transverse wall 23, and the rim portion has an annular skirt 24 that extends axially inwardly of the roll 10 in opposition to the skirt portion of the opposite head member. Each rim portion 22 is radially inwardly relieved axially outwardly of the skirt 24 to form an annular lock groove 25 that terminates at its axially outer extent, in a radially directed end flange 26. Although the cross section of the lock groove 25 is not per se critical, it has been found that the stepped, or multi-level, cross section depicted works quite well, particularly with the winding apparatus subsequently described herein.

The end flange 26 may be spaced axially outwardly of the exterior face 28 on the transverse wall 23 to provide a shoulder 29 by which the roll 10 may be grasped. This axial positioning of the end flange 26 also recesses—and thus protects—the aperture 18 which opens through the exterior face 28.

On the opposite side of each head member, the hub portion 16 and the skirts 24 both may be extended axially inwardly of the transverse wall 23 to define an annular cavity 30 into which the core 14 extends. The cavity 30 provides an additional lateral anchor between the end members 12 and 13 and the core 14.

In the preferred forms of the roll depicted herein, the cylindrical core 14 is formed from a rigid urethane foam, the radially outer surface 31 of which extends cylindrically between the radially outermost surface 32 on the skirts 24 of opposed head members 12 and 13. Rigid urethane foams may readily be produced by either of two methods—the quasi-prepolymer or the "one shot" method. In the quasi-prepolymer method the diisocyanate is reacted with a portion of the polyester to give an NCO-terminated prepolymer. In the foaming step the prepolymer is reacted with the rest of the polyester, catalyst, surfactant and fluorocarbon. The "one shot" process is more economical in that no prereaction step is required. This process requires, simply, that at least two conduits lead to a mixing head since all the components can be premixed except for the diisocyanates. The foam reaction begins immediately upon the addition of the diisocyanate, and apparatus particularly adapted for the charging of molds according to the "one shot" process can be found in my prior U.S. Patent No. 3,264,067.

The cylindrical outer surface 31 of the core 14 as well as the radially outer surface 32 of the skirt portion 24 of each rim 22 is encased in the outer skin 15 which extends into the lock groove 25 to join the components into an integral roll 10.

In the preferred forms of the roll depicted herein the skin 15 is a polyester resin filled with fibrous glass yarn. By themselves polyester resins—which are linear, condensation polymers resulting from the reaction of dicarboxylic acids with glycols—do not possess good strength properties, but in combination with reinforcing fibers provide suitable structural characteristics. Quite satisfactory results are obtained with a non-thixotropic, unpromoted high molecular weight isophthalic polyester resin coated onto fibrous glass yarn that is wound onto the assembled head members 12 and 13 and core 14 and into the lock grooves 25 such that the finished roll presents a cylindrical outer surface. So wound, the resin is polymerized and the resulting roll 10 is structurally integrated.

It should be appreciated that for some installations high torque loadings will be applied to the roll. For these situations it is imperative that provision be made to transfer the stresses induced by this loading between the various components forming the roll. It has been found that load transfer between the support beam 11 and the hood members 12 and 13 requires particular attention, and that on occasions load transfer between the support beam 11 and the core 14 must be given consideration.

When the torque between the square, tubular beam 11 and the head members 12 and 13 exceeds the ability that the elastomeric head members possess to withstand such loading, a loaded transfer coupler 35 is incorporated in the head member.

Figure 4:
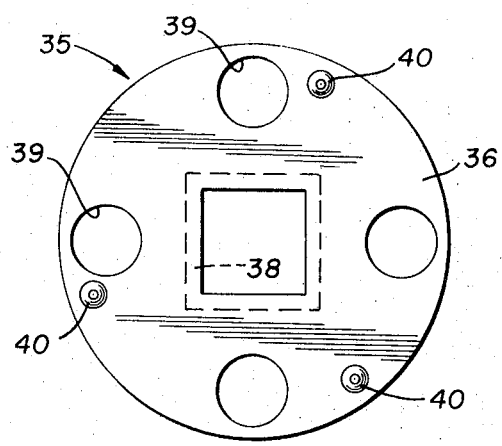
FIG. 4 is an opposite end elevation of the coupler depicted in FIG. 3.
Figure 5:
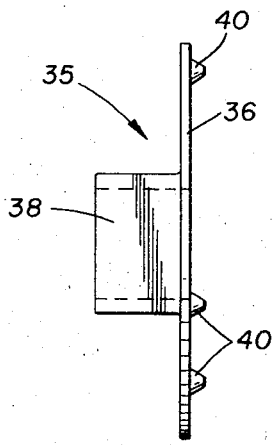
FIG. 5 is a side elevation of the coupler depicted in FIGS. 3 and 4.
Figure 11:
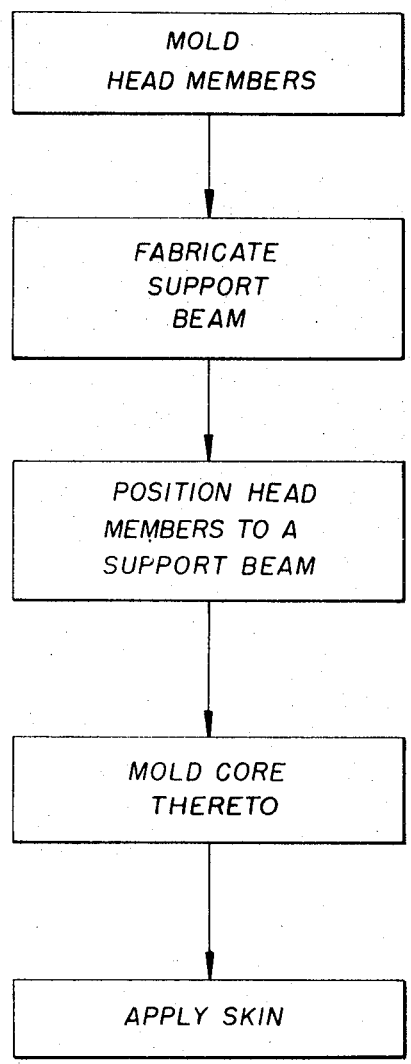
FIG. 11 is a flow chart representing the method for fabricating an industrial roll embodying the concept of the present invention.

As shown in FIGS. 3–5, the load transfer coupler 35 has a base plate 36 that is affixed to and extends radially from one end of a socket portion 38. The base plate 36 has a plurality of bonding bores 39 extending therethrough and a plurality of spacer nibs 40 extending outwardly therefrom in a direction opposite the socket portion 38.

Figure 6:
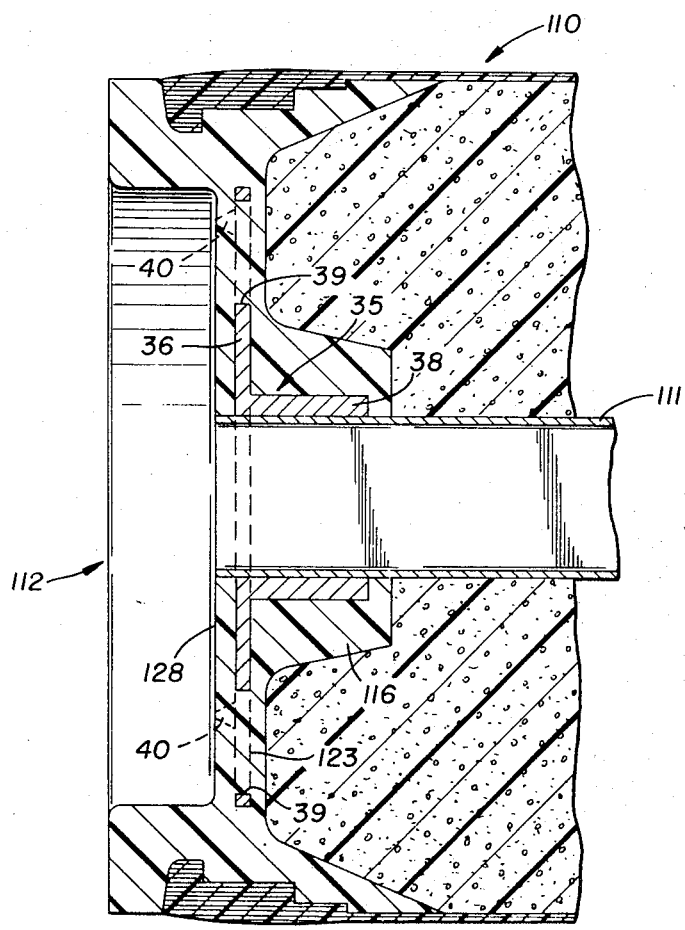
FIG. 6 is a longitudinal cross section similar to a portion of FIG. 1 representing a roll incorporating the coupler depicted in FIGS. 3–5.

As shown in FIG. 6, the coupler 35 is embedded within the head member 112 of a roll 110. The socket portion 38 of the coupler 35 is positioned within the hub portion 116 of the head member 112, and the base plate 36 is received within the transverse wall 123. The base plate 36 is positioned axially inwardly of the exterior face 128 by the length of the nibs 40. The nibs 40 engage the mold surface that forms the exterior face 128 when the head member 112 is cast. In this way, the base plate 31 is fully embedded within the transverse wall 123, and the elastomer from which the head member is formed will extend through the bonding bores 39 fully to anchor the coupler 35 within the head member 112 and thus distribute the torsional load between the coupler 35 and head member 112 without deleterious effects on the latter.

The beam 111 of roll 110 is received within the socket portion 38 to transfer the torsional loads between the coupler 35 and beam 11.

For those situations where the torsional load transfer between the beam 11 and the core 14 must be implemented beyond that capacity for such transfer as is accomplished by the encasement of the rectilinear beam 11 within the core 14, transfer blades may be utilized.

In one form, laterally extending, longitudinal load transfer blades 41 and 42 may extend from opposed corners 43 and 44 of the support beam 211 into the core 214. As shown by the solid line representation in FIG. 7, the beam 211 extends longitudinally beyond transfer blades 41 and 42 so that the beam may be received within the socket portion 38 of a coupler 35, as depicted in FIG. 8. However, the hub portion 216 is slotted, at 216a and 216b, to accommodate the blades 41 and 42 and permit them abuttingly to engage the socket portion 38. In other respects the head member 212 may be identical to head member 112.

Depending upon the particular usage conditions to which the roll will be subjected, it may be satisfactory for a beam 211 to be received directly within a head member 312 without the necessity for a coupler 35. In this situation the plates 41 and 42 would preferably extend the full length of the beam 211, as shown by the chain line representation in FIG. 7. With the blades so extended, the axial extent of the slots 343 and 344 in the hub portion 316 of the head member 312 would determine the depth to which the beam 211 would be received in the head member. As shown in FIG. 9, the beam 211 extends no further than the transverse wall 323.

As can be clearly seen from FIG. 7, the support beam depicted therein may be made from opposed halves 211a and 211b spot welded together along the blades 41 and 42, as at 45. Among other constructions, it would also be possible to fasten independent blades 46 along one side 48 of a rectilinear support beam 411 so as to extend laterally thereof (FIG. 10).

Industrial rolls embodying the concept of the present invention may be fabricated with ease. At least two head members 12 and 13 are first molded from the desired material and the selected form of beam 11 is fabricated. The head members 12 and 13 are positioned at opposite ends of the beam 11, and this configuration of parts may be maintained by a positioning plate 50 juxtaposed to the exterior face 28 on each head member and secured, as by nuts 51, to a tie rod 52 that extends through the beam 11 and the aperture 18 in each head member (FIG. 12). With the beam 11 suitably seated within the hub portion 16 of each head member 12 and 13, the tie rod 52, positioning plates 50 and nuts 51 comprise a clamping means by which these components are held in position, at least during the subsequent formation of the core 14.

The thus assembled beam 11 and head members 12 and 13 are positioned within a hollow, cylindrical mold 53 having an access vent 54, and a predetermined charge of core forming material is introduced through the access vent 54 by a charging nozzle, not shown. It should be appreciated that the head members 12 and 13 themselves provide the "end walls" of the mold, and with the radially outermost surfaces 32 on the skirts 24 of the head members snugly received against the radially inner surface 56 of the mold 53, the core 14 formed therein extends cylindrically between the skirts 24 on opposed head members 12 and 13.

After the mold has been charged the urethane forming materials are permitted to foam to completion and cure. The resulting skeletal roll 10a is then removed from the mold 53.

While the mold 53 may be a split mold, it has been found quite satisfactory, when the diameter of the end flange 26 is no greater than that of the skirt 24 on each end member, for the mold 53 to comprise an integral cylindrical tube. The skeletal roll 10a may be removed from mold 53 by applying an axial force thereto so that it slides out of the mold. If desired, a releasing agent may be applied to the inner surface 56 of the mold 53 prior to the formation of a skeletal roll 10a in order to facilitate subsequent removal thereof.

To complete the roll 10, the skin 15 must be applied to the skeletal roll 10a. The preferred method is to wind fibrous glass strands, freshly coated with unpolymerized polyester resin, onto the outer surface of the skeletal roll 10a. As soon as the resin polymerizes, the roll 10 is completed.

The application of the skin is readily accommodated by the apparatus, indicated generally by the numeral 60, depicted in FIGS. 13–16. The apparatus 60 has a frame 61 which carries a tail stock 62 in spaced relation to a drive housing 63. A drive spindle 64 extends outwardly from the housing 63 in opposition to a freely rotatable, support center 65 presented from the tail stock 62. The skeletal core 10a is mounted between the support center 65 and the drive spindle 64 for rotation with the power drive spindle 64.

A winder 66 reciprocates along a trackway 68 secured to the frame 61 so as to lie parallel to the skeletal roll 10a onto which the skin 15 is to be applied. A plurality of fibruous glass strands 69—which may comprise one or more filaments—extend individually from a supply bank, not shown, adjacent the apparatus 60 through an aligning comb 71 and into a resin pot 72—both carried on the winder 66. Because of the comb 71, the strands 69 of fibrous glass enter the pot in a generally separated and spread position so as to become completely coated with the unpolymerized resins supplied to the pot 72. As the strands 69 pass through the resin they come together and merge in a substantially flat ribbon 75 for winding onto the skeletal roll 10a. While the base of the pot 72 has an opening 76 through which the ribbon 75 of strands 69 emerge, a hemispherical doctor 78 is resiliently biased into the opening 76. Doctor 78 presents the resin within the pot from spilling out through the opening 76, and, at the same time, wipes the superfluous resin from the ribbon 75 as it leaves the pot 72.

By mechanically coupling the reciprocation of the winder 66 to the rotation of the drive spindle 64, as by gearing, not shown, within the housing 63, the ribbon 75 may be helically wound onto the skeletal roll 10a. However, in order to integrate the finished rolls it is necessary to lock the skin 15 into the head members 12 and 13—i.e., the skin 15 must be applied so as to fill the lock groove 25 on the rim 22 of each head member and yet present a substantially cylindrical outer surface on the completed roll 10.

Both results are obtained by forming the skin 15 with a plurality of reciprocations of winder 66 and by delaying the reciprocation of the winder 66 when the ribbon 75 is being wound into the lock grooves 25. Because the lock grooves 25 are located at each end of the length being wound, the winder 66 is delayed at the direction reversal points of its reciprocation. As best shown in FIG. 14, this be accomplished by using a drive chain 79 to move the winder 66, the drive chain delineating a rectilinear course and being secured to the winder 66 through a lost motion connector 80. The chain 79 is driven by a drive sprocket 81 connected, through power train 82, from the gearing arrangement, not shown, within the housing 63. The sprocket 81 may form one corner of the rectilinear course of the chain 79, and three idler sprockets 83, 84 and 85 may form the remaining four corners. It should be observed that all four sprockets 81, 83, 84 and 85 are supported such that no obstruction exists between the chain 79 and the trackway 68 on which the winder 66 moves.

One of the link pins 86 of chain 79 extends laterally of the chain and carries a rotatably mounted block 88 (FIG. 16) that is slidably received within a way 89 provided in a power transfer arm 90 on the winder 66.

Thus, irrespective of the direction in which the sprocket 81 drives chain 79, the winder 66 will reciprocate as the link pin 86 and slide block 88 sequentially traverse the substantially horizonal runs 91 and 92 of the rectilinear path defined by chain 79. However, as the link pin 86 and slide block 88 traverse the substantially vertical runs 93 and 94, oriented parallel to transfer arm 90, the block 88 will merely slide in way 89 to allow the winder 66 to delay at the direction reversal points of its reciprocation. By adjusting the extent of the vertical runs 93 and 94 the ribbon 75 will be wound onto the lock groove 25 such that when the core 14 is covered with a suitable layer of skin 15, the cylindrical outer surface thereof will extend axially over the lock grooves 25 to the end flange 26. In some situations it may be desirable to incline the runs 93 and 94 with respect to the power transfer arm 90 in order to provide some limited lateral movement of the winder 66 during the delay.

Once the skin has been wound into place the completed roll 10 may be removed from the skin applying apparatus 60 and allowed to stand, on one head member, until the resin of the skin 15 has polymerized.

It has been found advisable in some situation to apply a cylindrical, knit sleeve 96 over the exterior of the roll 10 in order to absorb any excess resin on the surface of the roll. When used, such a sleeve 96 becomes an integral part of the skin 15 as the resin polymerizes.

An industrial roll embodying the concept of the present invention is thus light in weight and at the same time possessed of excellent hoop strength and durability. Moreover, such a roll may be readily made according to the method and on the apparatus disclosed herein. The objects of the invention have therefore been accomplished.

I claim:

1. A method for making an industrial roll comprising the steps of, molding opposed head members with a recessed locking groove, positioning said head members to each of the two opposed ends of a beam means, molding a core around said beam means and between said head members and applying a skin to said core by helically winding a ribbon of skin forming material onto said core and into at least a portion of the lock groove in each of said head members.

2. A method for making industrial rolls, as set forth in claim 1 in which the ribbon is wound back and forth between the locking grooves on opposed head members a plurality of times at a substantiallly uniform helical lead, this reciprocation of said winding being delayed at the direction reverse of positions to wind additional wraps of ribbon into the lock grooves.

References Cited

UNITED STATES PATENTS

| | | | |
|---|---|---|---|
| 2,546,304 | 3/1951 | Huebner | 29—123 |
| 3,105,786 | 10/1963 | Anderson | 242—118.7 |
| 3,184,358 | 5/1965 | Utz | 156—244 |
| 3,366,719 | 1/1968 | Lueders | 156—187 |
| 3,416,982 | 12/1968 | Petzetakis | 156—244 |

FOREIGN PATENTS

| | | | |
|---|---|---|---|
| 226,487 | 1/1960 | Australia | 29—128 |

CARL D. QUARFORTH, Primary Examiner

G. G. SOLYST, Assistant Examiner

U.S. Cl. X.R.

156—187, 195, 245